E. G. LACEY.
SCROLL CUTTING MACHINE.
APPLICATION FILED MAR. 27, 1914.
1,211,456.
Patented Jan. 9, 1917.
2 SHEETS—SHEET 1.
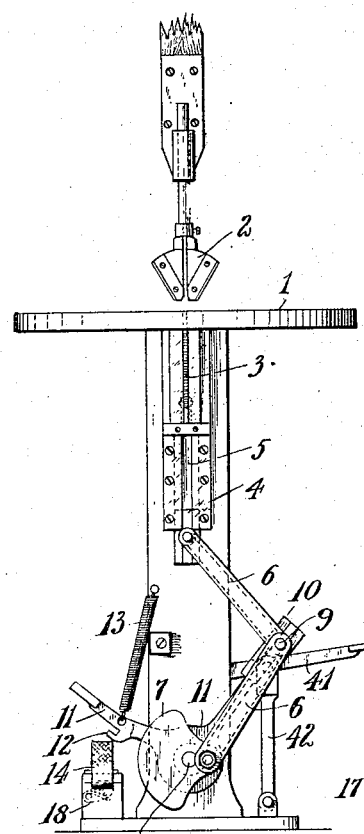
Fig. 1.
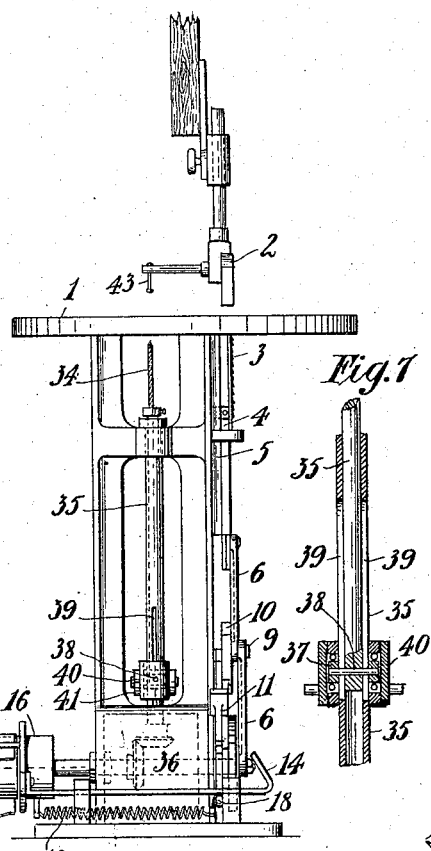
Fig. 2. Fig. 7.
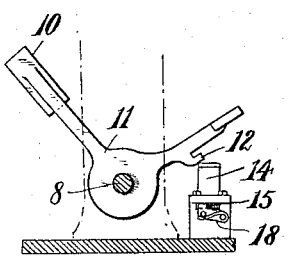
Fig. 5.
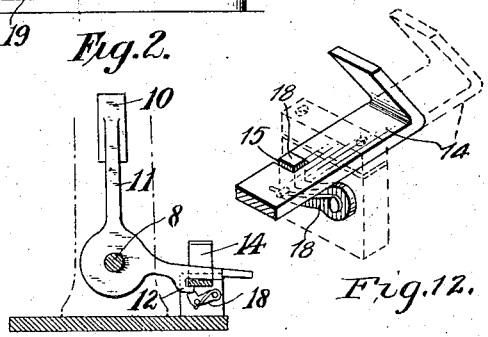
Fig. 11. Fig. 6. Fig. 12.
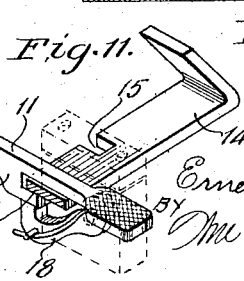
WITNESSES:
John C. Sanders
Albert F. Heuman
INVENTOR:
Ernest George Lacey
BY Wm. Wallace White
ATT'Y.

E. G. LACEY.
SCROLL CUTTING MACHINE.
APPLICATION FILED MAR. 27, 1914.
1,211,456.
Patented Jan. 9, 1917.
2 SHEETS—SHEET 2.
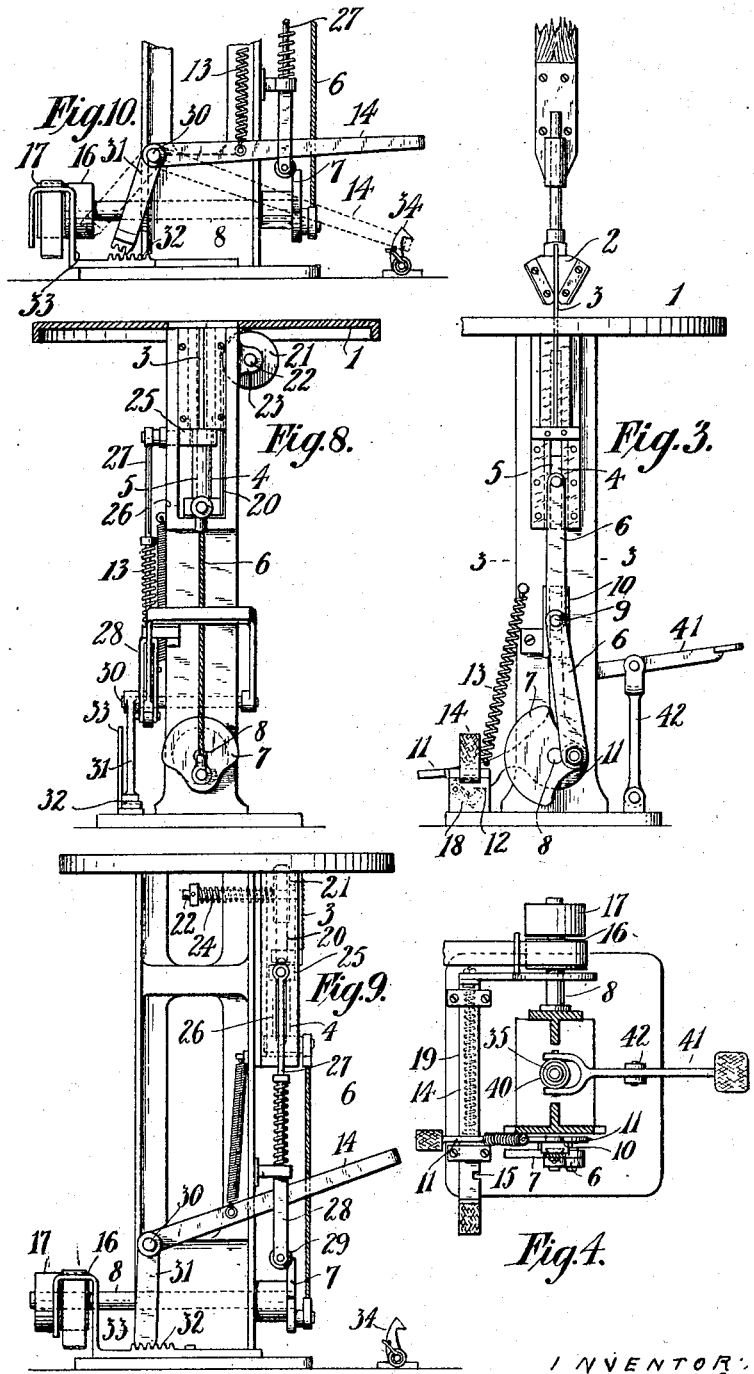

UNITED STATES PATENT OFFICE.

ERNEST GEORGE LACEY, OF SOUTH MELBOURNE, VICTORIA, AUSTRALIA.

SCROLL-CUTTING MACHINE.

1,211,456. Specification of Letters Patent. Patented Jan. 9, 1917.

Application filed March 27, 1914. Serial No. 827,666.

*To all whom it may concern:*

Be it known that I, ERNEST GEORGE LACEY, subject of the King of Great Britain and Ireland, residing at 282 City road, South Melbourne, in the State of Victoria, Commonwealth of Australia, have invented a certain new and useful Improved Scroll-Cutting Machine, of which the following is a specification.
This invention relates to an improved scroll cutting machine having a vertically reciprocating saw and refers more especially to a machine for cutting internal scrolls, that is to say scrolls having an outlet and in which the saw has to be inserted into an interior hole previously bored through the work to commence the cut and withdrawn therefrom afterward before the work can be renewed.
With scroll cutting machines as at present in use, when applied to the cutting of internal scrolls, either the saw blade has to be disconnected for its insertion into and withdrawal from the work, or the guide of the said saw blade above the table has been made to swing back to allow of the work being placed over and removed from the blade. Both of these arrangements involve a considerable expenditure of time and manipulation in transferring the blade from one internal scroll to another.

According to this invention, the saw blade is withdrawn beneath the table of the machine without in any way disconnecting said blade or removing, or interfering in any way with the blade guide so that the work may be always maintained upon the table and the saw transferred from one internal scroll to another with a minimum expenditure of time and labor.

This invention comprises means for withdrawing the saw blade beneath the table without disconnecting it from the operating parts. It is adaptable to many different makes and designs of machines and is not confined to any specific mechanical device for effecting this result. For instance, in adapting this invention to a machine in which the saw blade works in a guide above the table and is connected to a sliding carrier beneath the table operated by a connecting rod leading to a crank or eccentric disk, I provide a collapsible connection between the said crank or eccen-
tric disk and the said sliding carrier, such
as by a knuckle joint in the connecting rod itself. This knuckle joint is connected to a slide upon one arm of a bell crank lever, the other end of which is operated by a foot lever or treadle. This bell crank lever is preferably provided with a spring catch which is released by the starting treadle. Thus when the knuckle joint and the slide are in direct line the crank or eccentric disk operates the saw blade with a reciprocating movement in its position projecting through the table and engaging the overhanging guide, but when the bell crank lever is released and the knuckle joint thrown over to one side, the slide is lowered and the saw blade withdrawn beneath the table while the motion may still continue. It will be obvious that numerous mechanical devices may be devised for effecting this purpose, such as by making the connection between the saw blade and the reciprocator of a flexible nature operating in tension with a spring return and operating on the said flexible connection to withdraw the saw blade against the tension of the spring. I wish it to be understood that I do not confine myself to any specific mechanical device for effecting the purpose of my invention.

The invention will now be more fully described aided by a reference to the accompanying sheets of drawings in which—

Figure 1 is a front view of a scroll cutting machine in which the saw blade is operated from beneath the table and works in an overhanging guide above the table, showing the adaptation of my invention thereto by means of a collapsible connecting rod for operating the saw, the said saw being shown withdrawn beneath the surface of the table, while Fig. 2 is a side elevation of the device as shown in Fig. 1. Fig. 3 is a front view of the device as shown in Fig. 1 showing the knuckle joint of the connecting rod and the sliding saw carrier in a direct line the saw blade projecting through the table as operating. Fig. 4 is a sectional plan taken on line 3—3 of Fig. 3 showing the starting and releasing device. Fig. 5 is a detail view looking from the back of the machine, of the bell crank lever to which the knuckle joint is connected showing the position when the saw is withdrawn and out of operation as in Figs. 1 and 2. Fig. 6 shows the position of the same bell crank lever when the connecting rod is in a direct line with the saw blade operating as shown in Fig. 3. Fig. 7 is an enlarged detail view of the operating spindle of the boring bit. Figs. 8, 9 and 10 show a modified form of construction of machine wherein the connection between the saw and the driving shaft is of a flexible medium such as a cord or belt. Fig. 11 is a detail perspective showing the bell crank lever engaging the treadle when the connecting rod is in a straight line and the saw in motion. Fig. 12 shows the treadle out of engagement with the bell crank lever when the saw is out of motion and drawn beneath the table.

In these drawings a scroll cutting machine comprises a table or work support 1 above which is an adjustable overhanging guide 2 adapted to receive a reciprocating saw blade 3. In adapting my invention to this machine the said saw blade 3 is attached to a slide or carrier 4 arranged under the table 1 and adapted to work in a suitable guide 5 mounted on the machine frame. This slide or carrier 4 is connected to one end of a collapsible connecting rod 6 the other end of which is connected to the crank or eccentric 7 mounted on the driving shaft 8 of the machine. The collapsible connecting rod 6 is adapted to be operated by suitable means whereby the knuckle joint 9 may be thrown to one side and at the same time draw the saw 3 beneath the table. One of such means is shown in Figs. 1 and 2 and comprises a slide 10 in which is mounted the pin of the knuckle joint 9. The said slide 10 is formed on or secured to one of the arms of a bell crank lever 11 adapted to be operated by the foot. The other arm of the said bell crank lever 11 is furnished with a stop or catch 12 adapted to engage the spring actuated stopping and starting treadle 14, while a spring 13 is provided and adapted to return the bell crank lever 11 to its normal position when released from the stopping and starting treadle 14. The said bell crank lever 11 is loosely mounted on the driving shaft 8 and is adapted to be put into engagement with the stopping and starting treadle 14 by a downward movement of the foot piece. This starting and stopping treadle 14 is formed with a notch or recess 15 by which it may be released from the stop 12 when operated in a backward direction by the foot thereby releasing the bell crank lever 11 when the tension of the spring 13 causes the said bell crank lever to throw the knuckle joint or hinge 9 to the one side and at the same time withdraw the saw 3 beneath the surface of the table 1 as shown in Fig. 1. The backward movement of the said starting treadle 14 not only releases the bell crank lever 11 but at the same time transfers the belt from the fast pulley 16 to the loose pulley 17 on the driving shaft 8 and thus stops the machine. A suitable spring actuated catch 18 is provided to engage the slot 15 of the said treadle 14 and hold the same in its backward position against the tension of the spring 19 which is adapted to return the said treadle 14 to its normal position when the said catch 18 is released by the stop 12 during the downward movement of the bell crank lever 11.

To raise the saw to its proper working position by exerting a downward pressure on the foot piece of the bell crank lever 11, the knuckle joint 9 of the connecting rod 6 on the slide 10 and the saw carrier 4 are brought into direct line and at the same time the stop 12 of the bell crank lever 11 contacts with the catch 18 and puts the same out of engagement with the starting treadle 14 which by the tension of the spring 19 moves back and engages the stop 12 of the bell crank lever 11 and holds the same in the position shown in Figs. 3 and 6 while at the same time the treadle 14 transfers the driving belt from the loose to the fast pulley and so starts the machine and puts the saw in motion.

A modification of my invention is shown in Figs. 8, 9, and 10 in which the reciprocating movement is imparted to the saw by means of a flexible connection, such as a flexible cord or belt 6 adapted to cause the downward stroke of the saw 3 while the upward stroke is effected by the tension of a spring. For this purpose a flexible cord or belt 20 is connected at one end to the saw carrier 4 and at its other end to the periphery of a roller or pulley 21 loosely mounted on a stationary spindle 22 supported in a bearing 23 secured to the machine frame. A coiled spring 24 surrounds the said spindle 22 with its one end connected thereto and its other end connected to the said roller or pulley 21. When the said carrier 4 is drawn down by the connecting cord or belt 6 the spring 24 is tensioned providing the necessary power for the upward stroke. For the purpose of drawing the saw blade below the table a sliding block 25 is provided surrounding the carrier 4 and working in a guide slot 26 formed in the machine frame. A downwardly projecting rod 27 is connected at its upper end to the said block 25 and is furnished at its lower end with a slot or loop 28 through which one of the side arms of the stopping and starting treadle 14 passes, the said loop 28 being furnished with a friction roller 29 adapted to engage the said arm. This treadle 14 is mounted on a rocking shaft 30 on which is secured a toothed quadrant 31 adapted to engage a rack 32 on the belt shifter 33 in order that when the said treadle 14 is pressed downward from the position shown in Fig. 9 to the position shown by full lines in Fig. 10 the driving belt is transferred from the fast to the loose pulley thus stopping the machine. By continuing the downward movement of the said treadle 14 to the position shown by dotted lines in Fig. 10 the sliding block 25 surrounding the saw carrier 4 is drawn down by the rod 27 and in so doing contacts with the said carrier 4 and draws the saw below the table. The saw is maintained in its lowered position by the catch 34 engaging the treadle 14. When the said catch is released the spring 13 on the treadle 14 raises the same while the sliding block 25 assumes its normal position to allow the saw carrier 4 to be raised by the belt roller 21 and spring 24. At the same time the belt is transferred from the loose to the fast pulley by the quadrant 29 and rack 30 operating the belt shifter 31.

In the Fig. 11 only a portion of the treadle 14 is shown for the sake of clearness. Thus it will be seen that when the machine is in motion the bell crank lever 11 is in the position shown in Figs. 3, 6, and 11, with the catch or stop 12 engaging the treadle 14, the downward movement of the bell crank lever 11 having released the catch 18 and caused the treadle to be drawn back by the action of the treadle spring 19 (see Fig. 2) and the belt transferred from the loose pulley 17 to the fast pulley 16.

In order to withdraw the saw beneath the table, the treadle 14 is pushed forward until the notch 15 is directly opposite the stop 12 on the bell crank lever 11 and the pivoted catch 18—when the tension of the spring 13 (see Figs. 1 and 3) causes the stop 12 to pass through the notch 15 and the bell crank lever 11 to assume the position shown in Figs. 1 and 5 and at the same time collapse the connecting rod 6 by throwing the knuckle joint 9 to one side and thereby withdraw the same. Immediately the stop 12 is clear of the notch 15 the pivoted spring catch 18 enters the said notch and holds the treadle in its forward position against the tension of the spring 19. Again, to put the saw in motion, the bell crank lever 11 is forced down when the stop 12 engages the spring catch 18 and forces the same out of the notch 15, thus allowing the treadle 14, to spring back by the tension of the spring 19 and immediately engage the said stop 12 and at the same time put the machine in motion by transferring the belt from the loose to the fast pulley.

In the machine shown in Figs. 1, 2, 3, and 4 a rotating bit 34 is provided for boring the necessary hole through the work for the insertion of the saw. This bit is mounted at the upper end of a vertically arranged telescopic shaft 35 mounted in suitable bearings on the machine frame and driven by the miter wheels 36 from the driving shaft 8.

The bit 34 is adapted to be raised through the table 1 for boring the work thereon, and then lowered below the surface of the table so as not to interfere with the cutting of the scroll. In order to operate the said rotating bit a collar 37 passes loosely about the outer sleeve portion of the telescopic shaft 35 and is rotatably connected to the inner portion of the same by pins 38 passing through slots 39 formed in the said outer part. This collar 37 is rotatably mounted in a sleeve ball bearing 40 which is pivoted to a foot lever 41 mounted on a hinged fulcrum 42. Thus when the said foot lever 41 is forced down, the inner portion of the telescopic shaft 35 is raised and the bit 34 thereon passed through the table and thence through the work. When the said foot lever is released the bit falls by gravity clear of the table as shown in Fig. 2.

For the purpose of indicating the position of the bit upon the surface of the work, an indicator 43 is provided slidably mounted in an arm in a direct vertical line above the bit. This indicator directs the operator as to the position of the bit and being slidably mounted, damage to the said bit is avoided when the latter works through.

I claim:—

1. In a scroll cutting machine, a work support, a reciprocating saw working through said support and having its upper end free and unconnected, and means for withdrawing said saw beneath the surface of said support while the saw is still reciprocating, whereby to render said support free of obstructions for manipulating the work thereon, the reciprocation of the saw being stopped when the saw is withdrawn.

2. In a scroll cutting machine, the combination with a work support, an implement mounted beneath said support, means for actuating said implement, means for raising said implement above the support and lowering the same beneath said support, said actuating means for said implement having operative connection with the raising and lowering means thereof for being thrown into and out of operation when the implement is raised and lowered, respectively.

3. In a scroll cutting machine, a work-support, a reciprocating saw working through the said support and having a free upper end, actuating means for the saw comprising a rotatable drive shaft, an eccentric provided upon the said shaft, a rod connecting the eccentric with the saw and including angularly adjustable sections connected by a hinged joint having an axially projecting slide, an adjustable member having a guide for the slide of the connecting rod joint, and means by which said adjustable member may be adjusted to affect the angular relation of the sections of the connecting rod so that the saw may be withdrawn beneath the support or restored to operative position above the support during its normal actuation.

4. In a scroll cutting machine, a work-support, a reciprocating saw working through the said support and having a free upper end, actuating means for the saw comprising a rotatable drive shaft, an eccentric provided upon the said shaft, a rod connecting the eccentric with the saw and including angularly adjustable sections connected by a hinged joint having an axially projecting slide, a lever pivoted concentric to the drive shaft and having a guide receiving the said slide of the connecting rod joint, and means by which the said lever may be adjusted angularly to affect the angular relation of the connecting rod sections so that the saw may be withdrawn beneath the support or restored to operative position above the latter during its normal reciprocation.

5. In a scroll cutting machine, a reciprocating saw a work-support through which the saw works, means for actuating said saw, a collapsible connection between said saw and the actuating means for imparting motion to the saw, means for controlling the operation of said actuating means, means for collapsing said connection to withdraw the saw from an operative relation with said work-support, means on said controlling means and said collapsing means adapted to co-operate, when said connection is collapsed, for simultaneously controlling said actuating means, upon operation of the collapsing means.

6. A machine of the character described comprising a reciprocating saw, means for actuating said saw, a collapsible rod connection between said actuating means and the saw, means controlling the operation of the actuating means and normally holding the same inoperative, said last mentioned means being formed with a notch, a spring pressed pawl adapted to engage with the notch, when the actuating means is thrown into operation, to maintain the operation of the actuating means, a treadle for collapsing and repositioning said rod connection, and a catch formed on the treadle and adapted to move through the notch of said controlling means and to engage said pawl when said rod connection is collapsed, and means for moving said controlling means to normal position so as to render the actuating means inoperative and to hold said rod connection in a collapsed position.

7. In a scroll cutting machine, a work support, a reciprocatory saw having a free upper end, and adapted to work through said support, actuating means for said saw, including a collapsible connection, means for withdrawing said saw beneath the surface of said support including said collapsible connection between the actuating means and the saw, stationary guide means for the saw beneath said work support, means for collapsing said connection to draw said saw below the support, means for moving said last-mentioned means in said position, and means connected therewith for normally holding said means in the position mentioned, said means being adapted to be actuated for elevating the saw to an operative position.

8. In a scroll cutting machine, a work support, a reciprocatory saw having a free end and adapted to work through said support, actuating means for said saw, means for starting and stopping said actuating means, means for withdrawing said saw beneath the surface of said support and comprising a collapsible rod connecting the actuating means and the saw, and means for collapsing said rod to draw said saw below the surface of said support and to an inoperative position, and for returning said saw to an operative position, said last-named means serving to throw the actuating means out of and into operative position, respectively.

In testimony whereof I affix my signature in presence of two witnesses.

ERNEST GEORGE LACEY.

Witnesses:
 Wm. A. Hack,
 E. Z. Cullen.